United States Patent
Ahn et al.

(10) Patent No.: US 8,179,505 B2
(45) Date of Patent: May 15, 2012

(54) TRANSFLECTIVE TYPE LIQUID CRYSTAL DISPLAY DEVICE HAVING A COLOR LAYER IN THE TRANSMISSIVE REGION AND A NON-COLOR LAYER IN THE REFLECTIVE REGION AND FABRICATING METHOD THEREOF

(75) Inventors: Byung Chul Ahn, Anyang-si (KR); Joo Soo Lim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 560 days.

(21) Appl. No.: 11/282,476

(22) Filed: Nov. 21, 2005

(65) Prior Publication Data
US 2006/0139517 A1 Jun. 29, 2006

(30) Foreign Application Priority Data
Dec. 23, 2004 (KR) .................. 10-2004-0111512

(51) Int. Cl.
*G02F 1/1333* (2006.01)
*G02F 1/1335* (2006.01)
(52) U.S. Cl. ......... 349/114; 349/106; 349/108; 349/110
(58) Field of Classification Search ................ 349/106, 349/113–114, 108, 110
See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Glück | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 6,219,122 B1 * | 4/2001 | Uchida et al. | 349/117 |
| 6,563,554 B2 * | 5/2003 | Okamoto et al. | 349/12 |
| 7,102,716 B2 * | 9/2006 | Lee et al. | 349/114 |
| 7,142,269 B2 * | 11/2006 | Ikeno et al. | 349/109 |
| 2001/0004276 A1 | 6/2001 | Urabe et al. | |
| 2002/0109811 A1 * | 8/2002 | Park et al. | 349/113 |
| 2002/0171791 A1 | 11/2002 | Anno et al. | |
| 2004/0096595 A1 | 5/2004 | Otagiri et al. | |
| 2004/0135945 A1 * | 7/2004 | Choi et al. | 349/114 |
| 2004/0189905 A1 * | 9/2004 | Oda et al. | 349/114 |
| 2006/0044240 A1 * | 3/2006 | Takizawa et al. | 345/88 |

FOREIGN PATENT DOCUMENTS

| | | |
|---|---|---|
| CN | 138707 | 12/2002 |
| CN | 1484046 | 3/2004 |
| JP | 2003-043239 | 2/2009 |
| KR | 2003-0025211 | 3/2003 |
| KR | 10-2004-0106634 | 12/2004 |

\* cited by examiner

*Primary Examiner* — Lauren Nguyen
(74) *Attorney, Agent, or Firm* — McKenna Long & Aldridge LLP

(57) ABSTRACT

A liquid crystal display device according to an embodiment of the present invention includes a black matrix on a first substrate to divide a pixel area having a reflection area and a transmission area; a color layer in the transmission area of the pixel area provided by the black matrix; and a non-color layer in the reflection area of the pixel area.

8 Claims, 10 Drawing Sheets

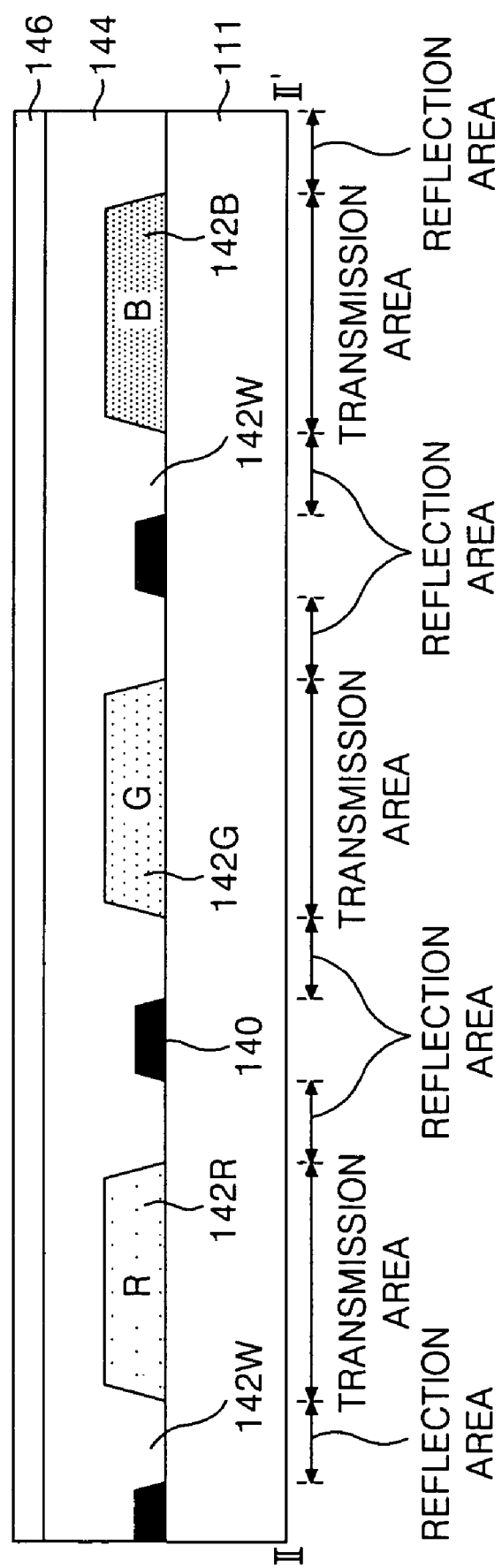

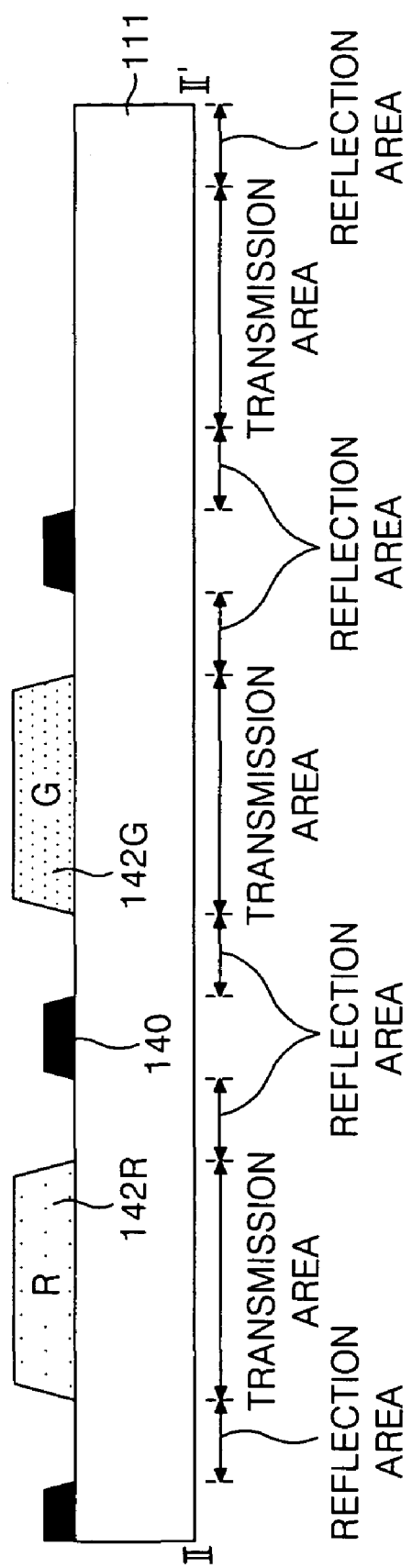

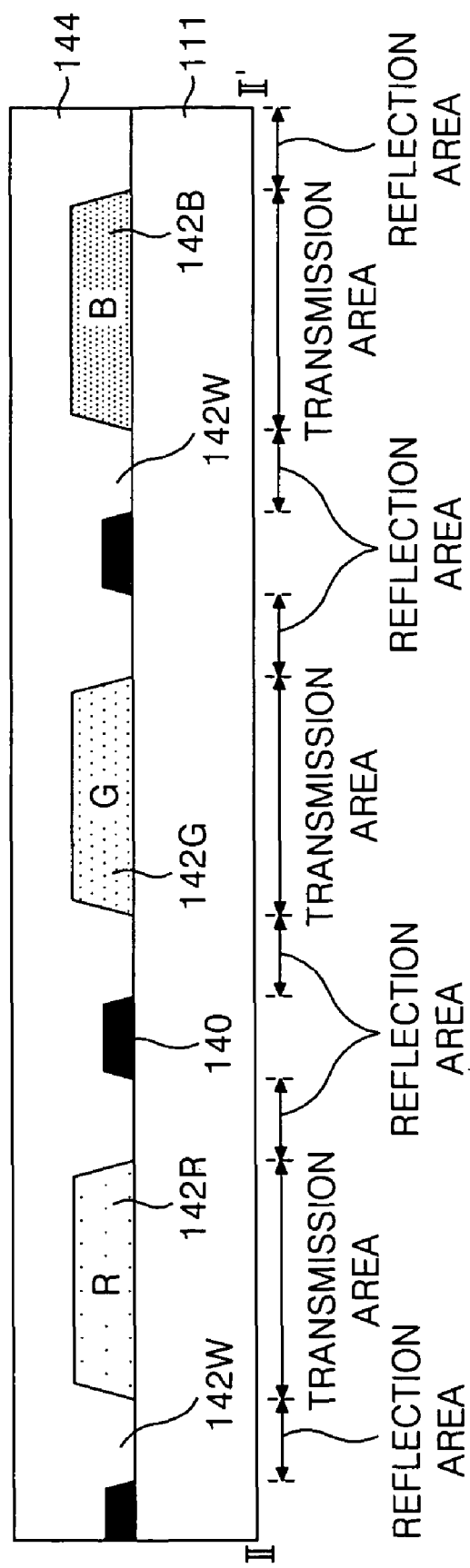

TRANSFLECTIVE TYPE LIQUID CRYSTAL DISPLAY DEVICE HAVING A COLOR LAYER IN THE TRANSMISSIVE REGION AND A NON-COLOR LAYER IN THE REFLECTIVE REGION AND FABRICATING METHOD THEREOF

This application claims the benefit of Korean Patent Application No. P2004-111512 filed on Dec. 23, 2004, which is hereby incorporated by reference for all purposes as if fully set forth herein.

BACKGROUND OF THE INVENTION

1. Field of the Invention

The present invention relates to a liquid crystal display device and a fabricating method thereof, and more particularly to a transflective type color filter substrate that increases the color gamut of a transmission area and brightness of a reflection area, and a fabricating method thereof.

2. Discussion of the Related Art

Generally, a liquid crystal display device LCD has liquid crystal cells arranged in a matrix shape in a liquid crystal display panel to control the light transmittance of the cells in accordance with a video signal to display a picture.

The liquid crystal display devices may be classified as transmission types and reflection types in accordance with the presence or absence of a light source. The transmission type liquid crystal display device transmits light from a backlight unit that is installed at the rear surface of a thin film transistor array substrate facing a color filter substrate with a liquid crystal therebetween to a display surface, thereby realizing a picture. The reflection type liquid crystal display device reflects an external light or a separate auxiliary light that is incident upon a lower substrate through an upper substrate to the display surface by use of a reflection plate formed on the thin film transistor array substrate thereby realizing the picture.

A transflective type liquid crystal display device has been proposed that takes advantages of both the transmission type and the reflection type display. The transfelective type liquid crystal display device operates in a reflection mode if the external light is sufficient and in a transmission mode by use of a backlight unit if the light is insufficient. Accordingly, the transflective type liquid crystal display device can reduce power consumption as compared to the transmission type liquid crystal display device and does not require an external light source like the reflection type liquid crystal display device.

The transflective type liquid crystal display panel shown in FIG. 1 includes a thin film transistor substrate 60 where a thin film transistor array is formed, and a color filter substrate 50 where a color filter array is formed.

On the color filter substrate 50, the color filter array having a black matrix for preventing light leakage, a color filter 42 for realizing color and a common electrode 46 that forms a vertical electric field with the pixel electrode are formed on an upper substrate 11.

On the thin film transistor substrate 50, the thin film transistor array having a gate line crossing a data line, a thin film transistor formed at the crossing of the gate and data line, a pixel electrode 22 formed in a pixel area connected to the thin film transistor, and a reflection electrode 30 formed in a reflection area of the pixel area are formed on a lower substrate 1.

The reflection electrode 30 reflects the external light that is incident through the color filter substrate 50, to the color filter substrate 50. An organic film formed under the reflection electrode has an embossed surface, and the reflection electrode thereon also has the embossed shape, thus reflection efficiency is increased by a dispersion effect.

The pixel electrode 22 generates a potential difference with the common electrode 46 by a data signal supplied through the thin film transistor. The potential difference causes a liquid crystal to rotate and the light transmittance is determined in accordance with the degree of rotation of the liquid crystal in each of the reflection area and the transmission area.

In case of the transflective type liquid crystal display panel, reflection light RL incident upon the reflection area is reflected at the reflection electrode 30 through a liquid crystal layer and emitted through the liquid crystal layer, as shown in FIG. 1. Transmission light TL from a backlight unit 40 that is incident upon the transmission area is transmitted through the liquid crystal layer and emitted to the outside.

In this display, the reflection light RL of the reflection area passes through the color filter 42 twice, but on the other hand the transmission light TL of the transmission area passes through the color filter 42 once, thus there is a color difference between the reflection area and the transmission area. At this moment, if the picture is realized on the basis of the color filter of the reflection area, the color gamut deteriorates more in the transmission area than in the reflection area. If the picture is realized on the basis of the color filter of the transmission area, the color gamut of the transmission part is improved, but there is a problem in that the brightness of the reflection area deteriorates.

SUMMARY OF THE INVENTION

Accordingly, the present invention is directed to a color filter substrate of transflective type and fabricating method thereof that substantially obviates one or more of the problems due to limitations and disadvantages of the related art.

An advantage of the present invention is to provide a transflective type color filter substrate increases the color gamut of a transmission area and brightness of a reflection area, and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device, including: a black matrix on a first substrate defining a pixel area having a reflection area and a transmission area; a color layer in the transmission area of the pixel area defined by the black matrix; and a non-color layer in the reflection area of the pixel area.

In another aspect of the present invention, a liquid crystal display device, including: a black matrix defining a pixel area having a reflection area and a transmission area; and a color filter formed to realize black and white in the reflection area and a color in the transmission area.

In another aspect of the present invention, a method of fabricating a liquid crystal display device, including: forming a black matrix defining a pixel area having a reflection area and the transmission area on a first substrate; forming a color layer in the transmission area of the pixel area provided by the black matrix; and forming a non-color layer in the reflection area of the pixel area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a cross sectional view representing the color filter substrate taken along the line II-II' of FIG. 2; and FIGS. 5A to 5F are a cross sectional diagram representing a fabricating method of the color filter substrate shown in FIG. 4.

DETAILED DESCRIPTION OF THE ILLUSTRATED EMBODIMENT

Reference will now be made in detail to the preferred embodiments of the present invention, examples of which are illustrated in the accompanying drawings.

With reference to FIGS. 2 to 5F, embodiments of the present invention will be explained as follows.

Figure 1:
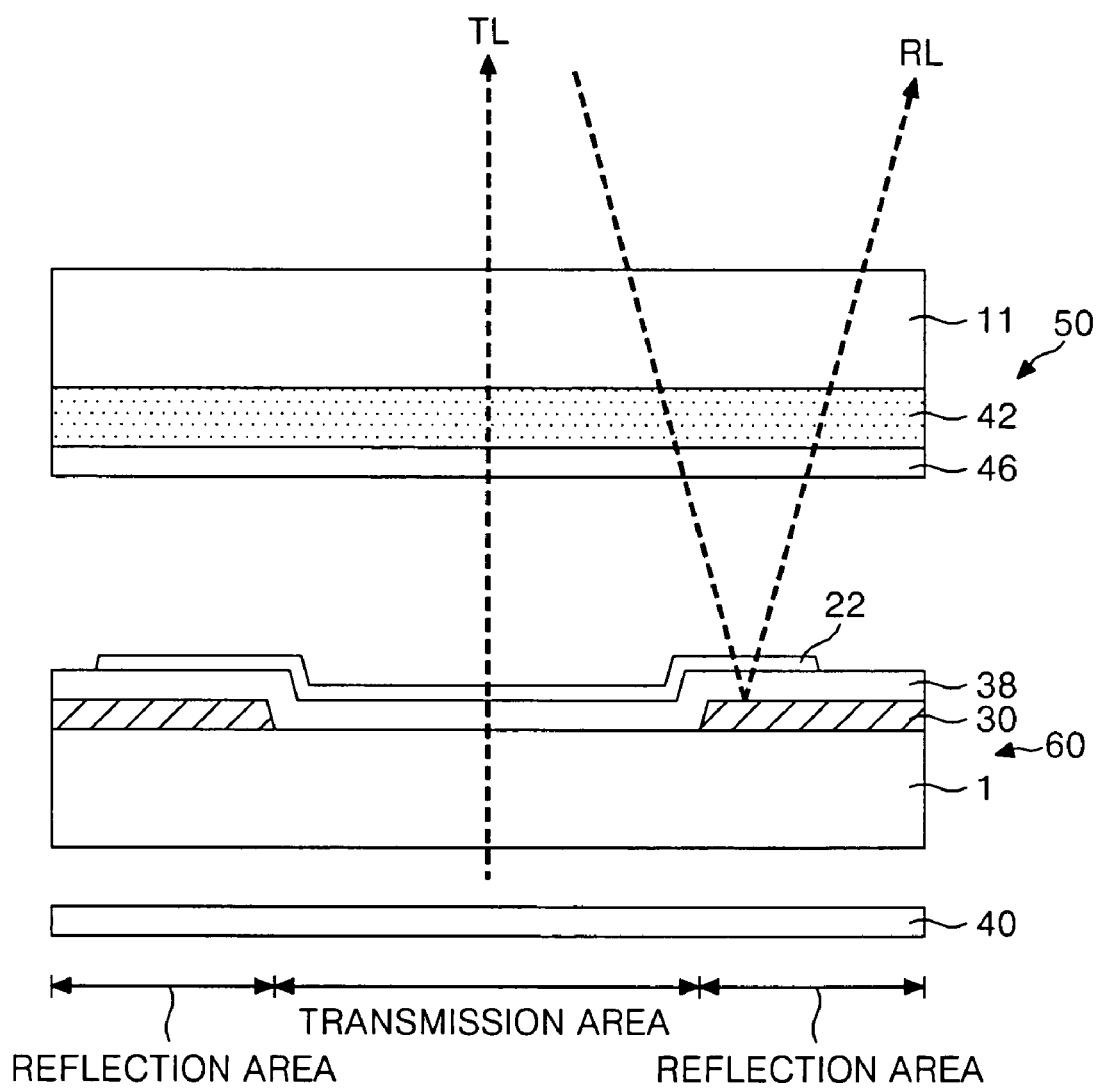
FIG. 1 is a plan view representing a transflective type liquid crystal display panel of the related art.
Figure 2:
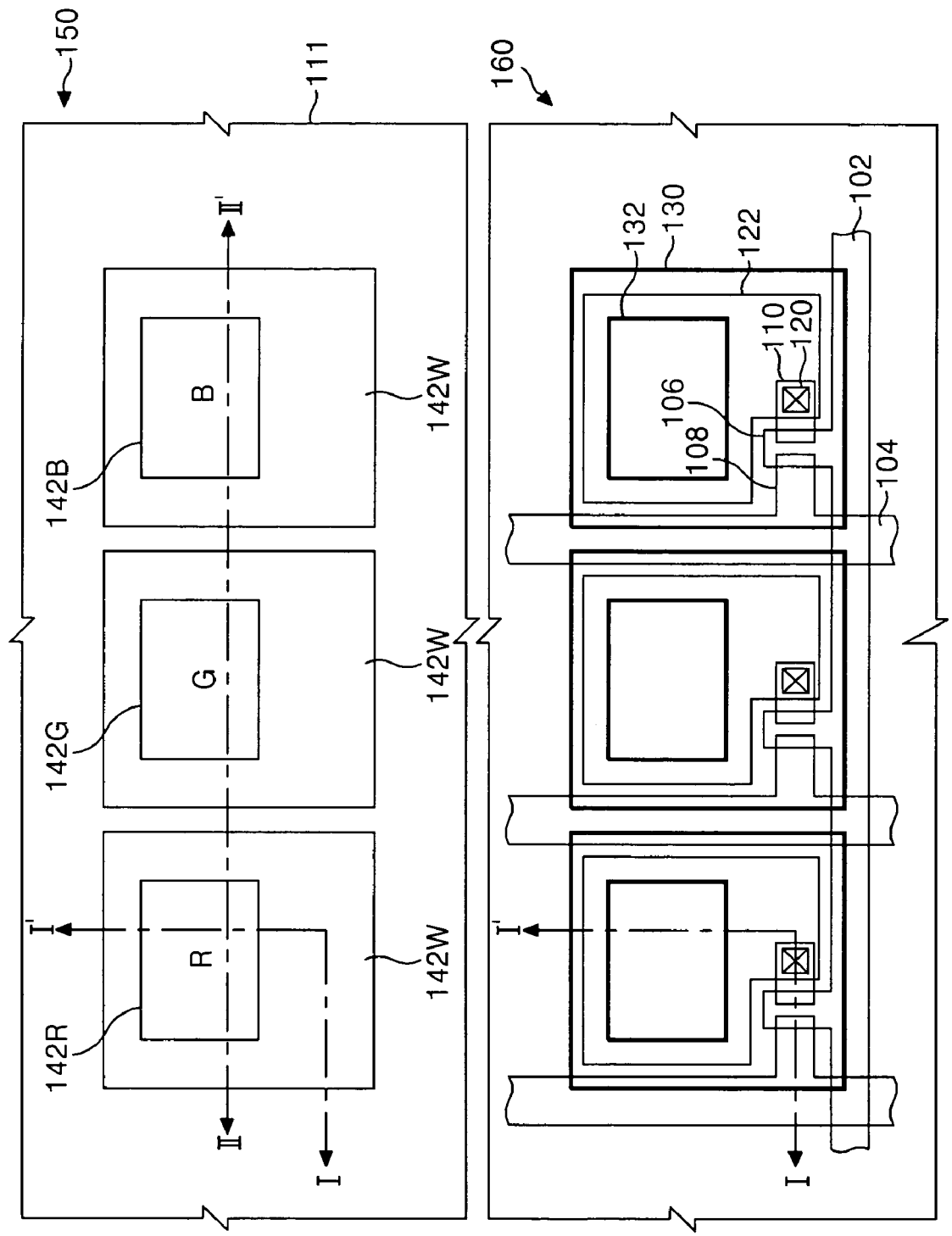
FIG. 2 is a plan view representing a thin film transistor array substrate and a color filter substrate of a transflective type liquid crystal display according to the present invention.
Figure 3:
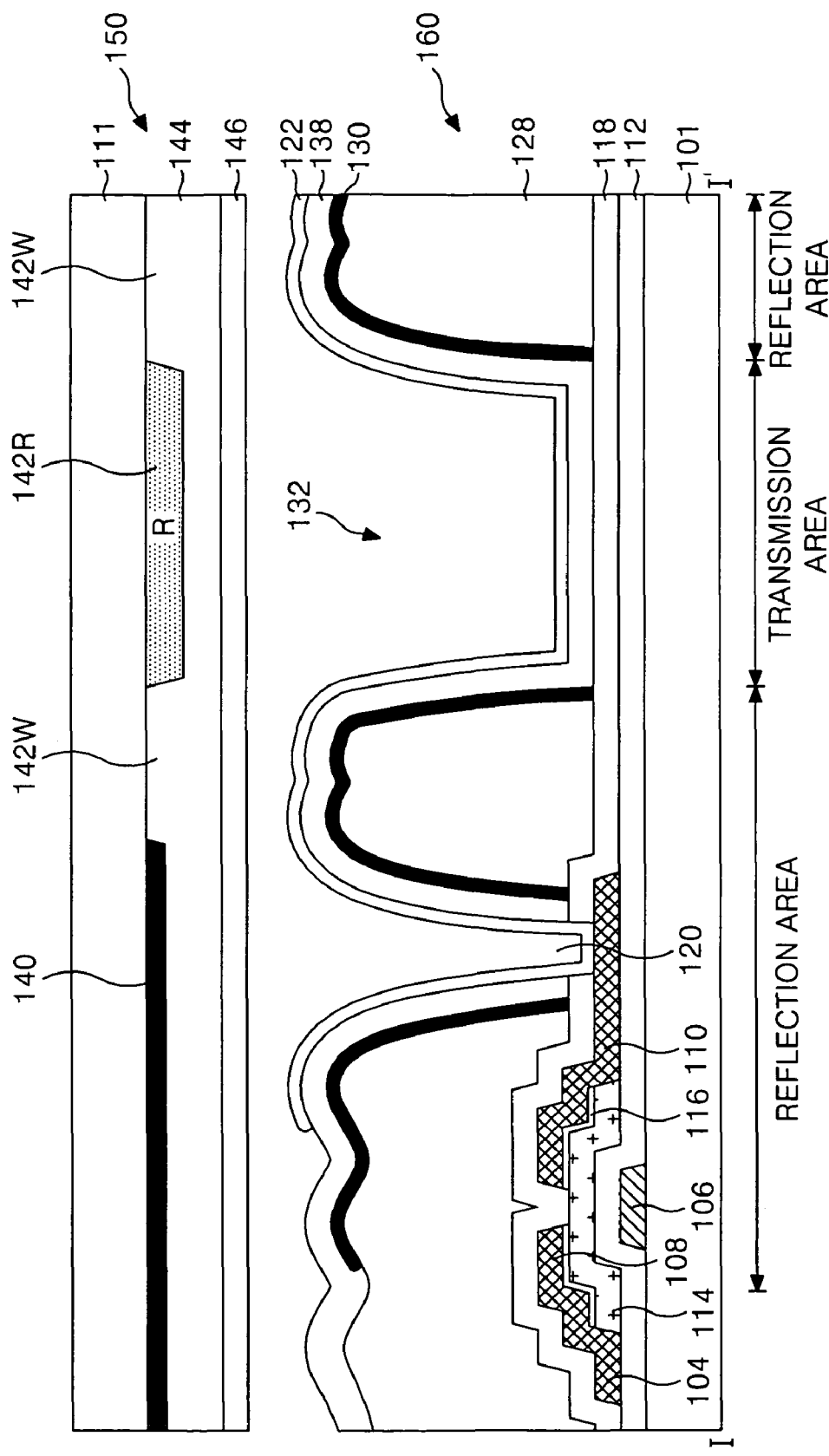
FIG. 3 is a cross sectional view representing the color filter substrate and the thin film transistor array substrate, taken along the line I-I' of FIG. 2.

FIG. 2 is a plan view representing a transflective type liquid crystal display panel according to the present invention, and FIG. 3 is a cross sectional diagram representing the liquid crystal display panel taken along the line I-I' of FIG. 2.

The transflective type liquid crystal display panel shown in FIGS. 2 and 3 includes a thin film transistor substrate 160 where a thin film transistor array is formed, and a color filter substrate 150 where a color filter array is formed.

The thin film transistor substrate 160 includes: a thin film transistor connected to a gate line 102 and a data line 104; a pixel electrode 122 formed in a pixel area connected to the thin film transistor; and a reflection electrode 130 formed in a reflection area of the pixel area.

The thin film transistor selectively supplies a data signal from the data line 104 to the pixel electrode in response to a gate signal from the gate line 102. The thin film transistor includes: a gate electrode 106 connected to the gate line 102; a source electrode 108 included as part of the data line 104; a drain electrode 110 connected to the pixel electrode 122 through a contact hole 120 which penetrates first and second passivation films 118, 138; an active layer 114 that overlaps the gate electrode 106 with a gate insulating film 112 therebetween to form a channel between the source electrode 108 and the drain electrode 110; and an ohmic contact layer 116 for improving electrical contact between the active layer 114 and both the source electrode 108 and the drain electrode 110.

The pixel electrode 122 is located in the pixel area defined by the crossing of the data line 104 and the gate line 102 and is formed of a transparent conductive material with high transmittance. The pixel electrode 122 is formed on a second passivation film that is formed over the entire surface of the lower substrate 101, and the pixel electrode 122 is electrically connected to the drain electrode 110 through the contact hole 120. The data signal supplied through the thin film transistor generates a potential difference between the pixel electrode 122 and the common electrode 146. The potential difference generates an electric field that causes the liquid crystal to rotate, and the light transmittance of the liquid crystal is determined in accordance with the degree of rotation of the liquid crystal in the reflection area and the transmission area.

The reflection electrode 130 reflects an external light that is incident through the color filter substrate 150 back to the color filter substrate 150. The reflection electrode 130 is embossed depending on an organic film 128 that is formed with an embossed surface thereunder, thus reflection efficiency is increased by dispersion. An area where the reflection electrode 130 is formed becomes the reflection area in each pixel area, and an area where the reflection electrode 130 is not formed becomes the transmission area in each pixel area.

A transmission hole 132 penetrating the organic film 128 is formed in the transmission area so that the path length of light path passing through the liquid crystal layer in the reflection area is the same as that in the transmission area. As a result, the reflection light incident upon the reflection area is reflected at the reflection electrode 130 through the liquid crystal layer to be emitted outside the display through the liquid crystal layer. The transmission light from a backlight unit (not shown) incident upon the transmission area is transmitted through the liquid crystal layer to be emitted outside the display. Accordingly, the length of the light path in the reflection area is equal to that in the transmission area, thus transmission efficiency of a reflection mode and a transmission mode of the liquid crystal display device becomes the same.

On the color filter substrate 150, a color filter array having a black matrix 140 preventing light leakage, a color filter 142 realizing color, an overcoat layer 144 formed on the color filter 142, and a common electrode 146 forming a vertical electric field with the pixel electrode 122 is formed on an upper substrate 111.

The color filter 142 is formed in the pixel area that is provided by the black matrix 140. The color filter 142 is formed in the transmission area to have an aperture in the reflection area of the pixel area. Accordingly, it is possible to realize a picture of chromatic color in the transmission area where the color filter is formed 142.

The overcoat layer 144 is formed of a transparent organic insulating material of acrylic resin, etc. for leveling the upper substrate 101 where the color filter 142 is formed. The overcoat layer 144, as shown in FIG. 4, is formed in the reflection area of the pixel area to act as a white color filter 142W. In the overcoat layer 144 formed in the reflection area, the light that is incident to the reflection area and exits therefrom is not transmitted through the color filter, thus its light amount is barely reduced. That is to say, the light transmittance in the related art reflection area is about 40%, but on the other hand the light transmittance in the reflection area of the present invention is 99% which is an improvement versus the related art. Further, the reflectibility in the related art reflection area is about 8%, but on the other hand the reflectibility in the reflection area of the present invention is 40%, thus it is improved by 5 times versus the related art. To convert this into brightness, it is 13[nit] in the related art on the basis of 500LUX in the related art, but it is 65[nit] in the present invention which is an improvement versus the related art. Accordingly, in the reflection area where the overcoat layer 144 acting as a white color filter is formed, a picture having black and white can be realized.

The transflective color filter substrate according to the present invention includes the transmission area where the color picture is realized and the reflection area where a black and white picture is realized. The transmission area where the color picture is realized has its color gamut improved versus the reflection area. The reflection area where the black and white picture has higher reflectibility than the transmission area resulting in high brightness, thus it is possible to reduce the current consumption of the backlight.

FIGS. 5A to 5F are sectional diagrams representing a fabricating method of a transflective color filter substrate liquid crystal display panel according to the present invention.

Figure 5A:
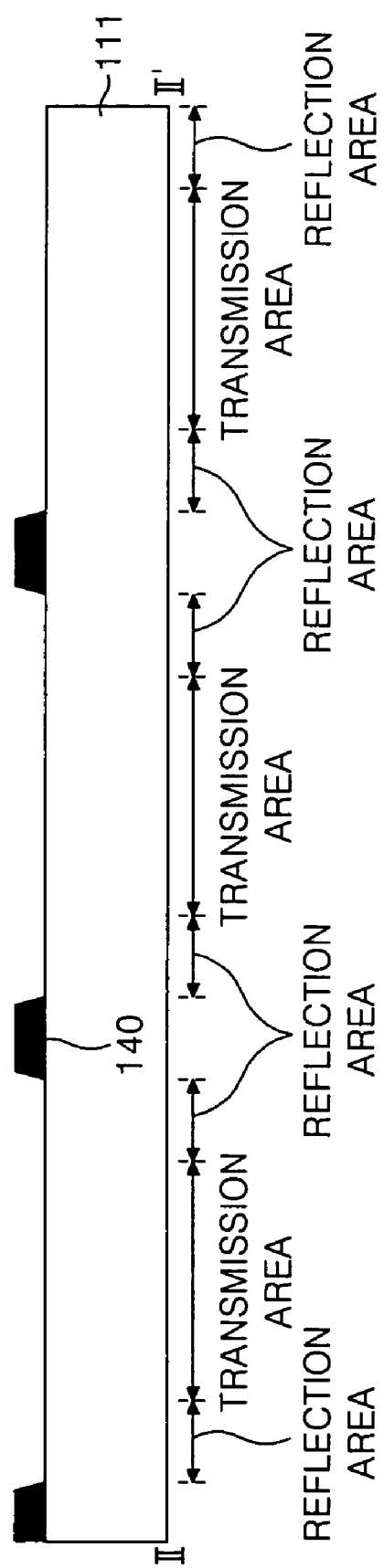

Referring to FIG. 5A, the black matrix 140 is formed on the upper substrate 101.

An opaque layer is formed on the upper substrate 111. The opaque layer is formed of an opaque metal layer such as chrome, etc. or an opaque resin. The opaque layer is patterned by a photolithography process and an etching process, thereby forming the black matrix 140.

Figure 5B:
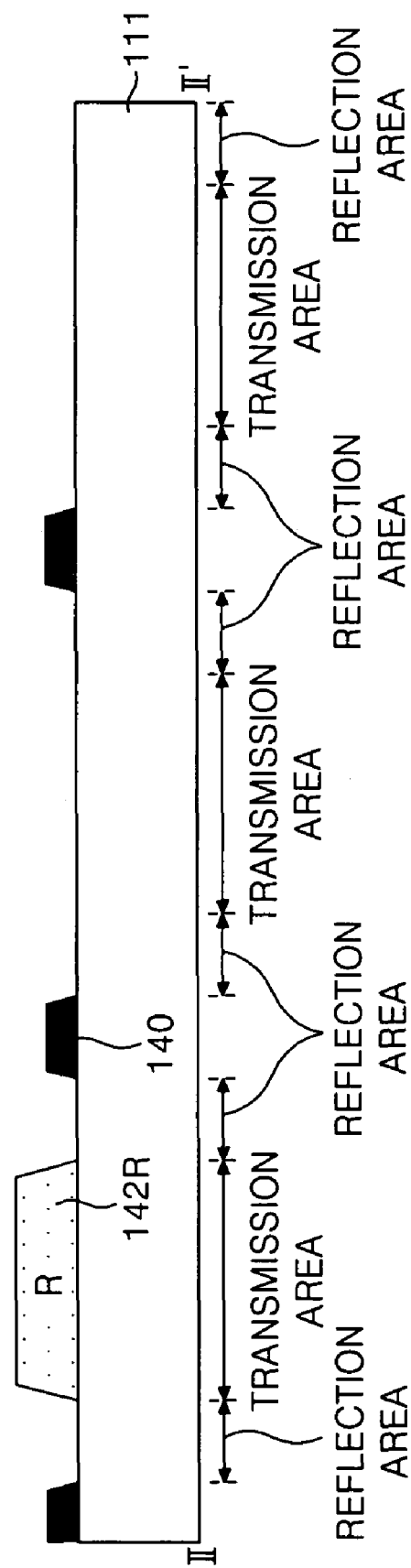

Referring to FIG. 5B, a red color filter 142R is formed on the upper substrate 111 where the black matrix 140 is formed.

A red resin layer is formed on the upper substrate 101 where the black matrix 140 is formed. The red resin layer is patterned by the photolithography process, thereby forming the red color filter 142R in the transmission area of the corresponding pixel area.

Referring to FIG. 5C, a green color filter 142G is formed on the upper substrate 111 where the red color filter 142R is formed.

A green resin layer is formed on the upper substrate 111 where the red color filter 142R is formed. The green resin layer is patterned by the photolithography process, thereby forming the green color filter 142G in the transmission area of the corresponding pixel area.

Figure 5D:
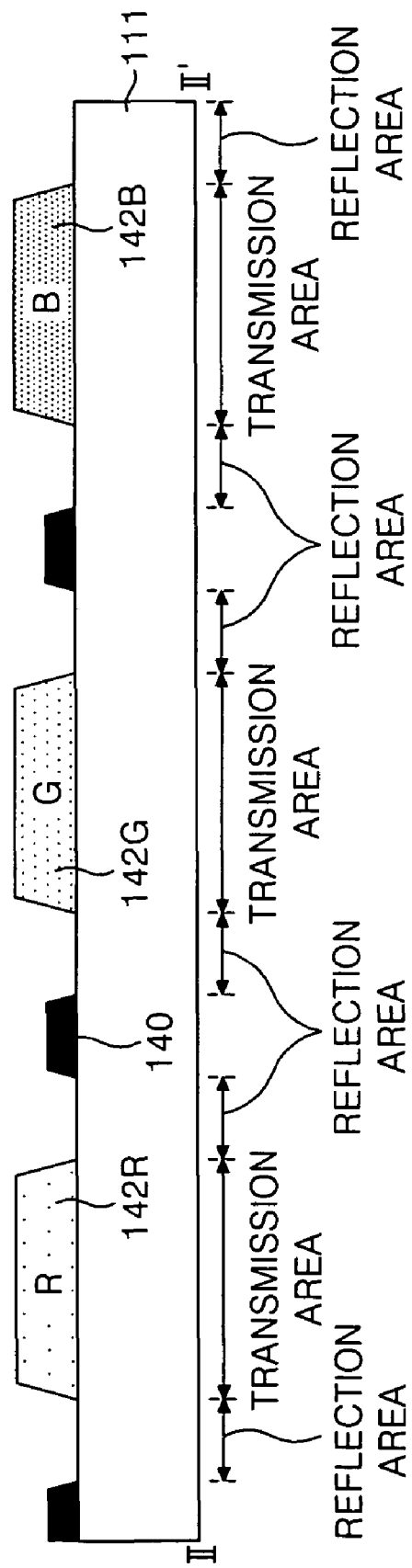

Referring to FIG. 5D, a blue color filter 142B is formed on the upper substrate 111 where the green color filter 142G is formed.

A blue resin layer is formed on the upper substrate 111 where the green color filter 142 is formed. The blue resin layer is patterned by the photolithography process, thereby forming the blue color filter 142B in the transmission area of the corresponding pixel area.

Referring to FIG. 5E, an overcoat layer 144 that also acts as a white color filter 142W is formed on the upper substrate 111 where the blue color filter 142B is formed. The overcoat layer is formed of acrylic resin. The overcoat layer 144 acts as the white color filter 142W in the reflection area of the pixel area.

Figure 5F:
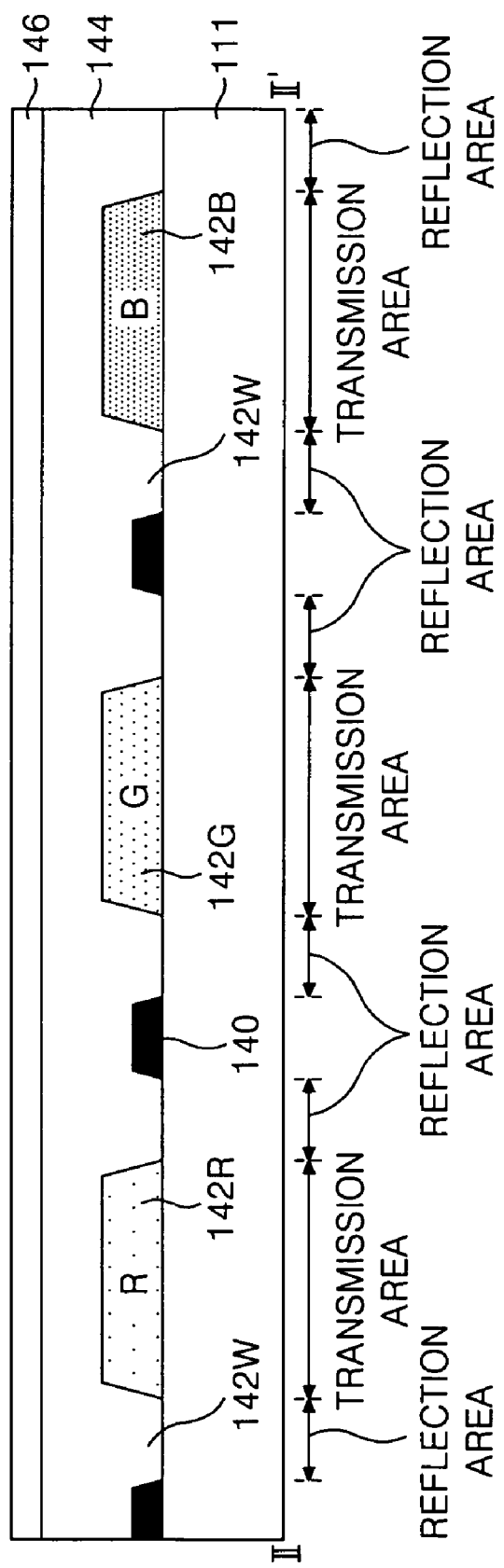

Referring to FIG. 5F, a common electrode 146 is formed on the overcoat layer 144.

A transparent conductive layer is deposited on the entire surface of the overcoat layer 144 by a deposition method such as sputtering, thereby forming the common electrode 146. The transparent conductive layer is formed of a transparent conductive material such as indium-tin-oixde, etc.

The transflective color filter substrate according to the present invention can be applied to a notebook, TV, a potable information terminal (for example, mobile phone, PDA, electronic pocket book), etc. The transflective color filter substrate according to the present invention applied to the mobile phone, the PDA, etc. displays character data, etc. in the reflection area, thus it is possible to obtain improvements such as high brightness, a reduction of power consumption of the backlight, etc.

As described above, the transflective color filter substrate and the fabricating method thereof according to the present invention includes the transmission area where the color pictures are realized and the reflection area where the black and white pictures are realized. The transmission area where the color picture is realized has an improved color gamut versus the reflection area. The reflection area where the black and white picture is realized has increased reflectibility versus the transmission area to realize high brightness, thus it is possible to reduce the current consumption of the backlight.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A transflective type liquid crystal display device, comprising:
    a black matrix formed on a first substrate to define a pixel area having a reflection area and a transmission area in each of a plurality of pixels;
    a color filter formed only on the transmission area to have an aperture in the reflection area, wherein the color filter has substantially the same size in each of the pixels;
    a white color layer formed on the first substrate on which the black matrix and the color filter are formed, wherein the white color layer has an evenness surface and contacts with the first substrate in the aperture in the reflection area;
    a gate electrode formed on a second substrate;
    a gate insulation film formed on the second substrate to cover the gate electrode;
    a semiconductor layer formed on the gate insulation film to be overlapped with the gate electrode;
    source and drain electrodes formed on the semiconductor layer;
    a first insulation film formed on the gate insulation film to cover the source and drain electrodes;
    a second insulation film formed on the first insulation film in an embossing shape;
    a reflection electrode formed on the second insulation film only in the reflection area;
    a third insulation film formed on the reflection electrode and the second insulation film; and
    a pixel electrode formed on the third insulation film in the transmission area and the reflection area,
    wherein the reflection area displays a black and white while the transmission area displays chromatic color, and
    wherein a total thickness of the black matrix and the white color layer in the reflection area is the same as that of the color filter and the white color layer in the transmission area.

2. The device according to claim 1, wherein the white color layer includes an overcoat layer that is formed over the whole pixel area to cover the color filter and the black matrix.

3. The device according to claim 2, wherein the overcoat layer is formed of an acrylic resin.

4. A method of fabricating a transflective type liquid crystal display device, comprising:
    forming a black matrix on a first substrate to define a pixel area having a reflection area and a transmission area in each of a plurality of pixels;
    forming a color filter on only the transmission area to have an aperture in the reflection area, wherein the color filter has substantially the same size in each of the pixels;
    forming a white color layer on the first substrate on which the black matrix and the color filter are formed, wherein the white color layer has an evenness surface and contacts with the first substrate in the aperture in the reflection area;

forming a gate electrode on a second substrate;

forming a gate insulation film on the second substrate to cover the gate electrode;

forming a semiconductor layer on the gate insulation film to be overlapped with the gate electrode;

forming source and drain electrodes on the semiconductor layer;

forming a first insulation film on the gate insulation film to cover the source and drain electrodes;

forming a second insulation film on the first insulation film in an embossing shape;

forming a reflection electrode on the second insulation film only in the reflection area;

forming a third insulation film on the reflection electrode and the second insulation film; and forming a pixel electrode on the third insulation film in the transmission area and the reflection area, wherein the reflection area displays a black and white while the transmission area displays chromatic color, and wherein a total thickness of the black matrix and the white color layer in the reflection area is the same as that of the color filter and the white color layer in the transmission area.

5. The method according to claim 4, wherein forming the white color layer includes:

forming an overcoat layer over the whole pixel area to cover the color filter and the black matrix.

6. The method according to claim 5, wherein the overcoat layer is formed of an acrylic resin.

7. The device according to claim 1, wherein the pixel electrode is directly contacted with the drain electrode without contacting with the reflection electrode via a contact hole penetrating the first, second and third insulation films.

8. The method according to claim 4, wherein pixel electrode is directly contacted with the drain electrode without contacting with the reflection electrode via a contact hole penetrating the first, second and third insulation films.

* * * * *